(12) United States Patent
Kim

(10) Patent No.: US 9,830,618 B2
(45) Date of Patent: Nov. 28, 2017

(54) ADVERTISEMENT MANAGEMENT

(71) Applicant: Empire Technology Development LLC, Wilmington, DE (US)

(72) Inventor: Seungil Kim, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 335 days.

(21) Appl. No.: 14/377,393

(22) PCT Filed: Jan. 15, 2014

(86) PCT No.: PCT/US2014/011621
§ 371 (c)(1),
(2) Date: Aug. 7, 2014

(87) PCT Pub. No.: WO2015/108513
PCT Pub. Date: Jul. 23, 2015

(65) Prior Publication Data
US 2015/0332328 A1    Nov. 19, 2015

(51) Int. Cl.
*G06Q 30/00* (2012.01)
*G06Q 30/02* (2012.01)
*G06F 17/30* (2006.01)
*H04N 21/2668* (2011.01)
*H04N 21/4223* (2011.01)
*H04N 21/442* (2011.01)
*H04N 21/81* (2011.01)

(52) U.S. Cl.
CPC ..... *G06Q 30/0261* (2013.01); *G06F 17/3082* (2013.01); *H04N 21/2668* (2013.01); *H04N 21/4223* (2013.01); *H04N 21/44218* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 6,938,098 B1 * | 8/2005 | Ukigawa | G06Q 30/02 709/203 |
| 7,962,604 B1 | 6/2011 | Morris et al. | |
| 8,468,056 B1 * | 6/2013 | Chalawsky | H04N 21/2547 705/14.41 |
| 9,386,328 B1 * | 7/2016 | Crane | H04N 21/4312 |
| 2007/0067203 A1 * | 3/2007 | Gil | G06Q 10/087 705/7.32 |
| 2008/0059293 A1 | 3/2008 | Hengel | |

(Continued)

OTHER PUBLICATIONS

International search report and written opinion for PCT Application No. PCT/US2014/011621 dated Apr. 18, 2014.

*Primary Examiner* — Matthew T Sittner
(74) *Attorney, Agent, or Firm* — Brundidge & Stanger, P.C.

(57) ABSTRACT

Technologies are generally described for an advertisement management scheme. In some examples, a method performed under control of an electronic device may include counting a number of users proximate to the electronic device; adjusting at least one attribute associated with an advertisement based at least in part on the counted number of users; and providing the users with the advertisement for which the at least one attribute has been adjusted.

12 Claims, 11 Drawing Sheets

(56) References Cited

U.S. PATENT DOCUMENTS

| | | | |
|---|---|---|---|
| 2009/0025024 A1* | 1/2009 | Beser | G06Q 30/0273 725/12 |
| 2009/0195392 A1* | 8/2009 | Zalewski | G06F 3/012 340/573.1 |
| 2010/0324992 A1 | 12/2010 | Birch | |
| 2011/0131105 A1* | 6/2011 | Aonuma | G06Q 20/20 705/24 |
| 2011/0251885 A1* | 10/2011 | Abigail | G06Q 30/02 705/14.31 |
| 2012/0150586 A1* | 6/2012 | Harper | G06Q 30/0204 705/7.33 |
| 2012/0194694 A1* | 8/2012 | Lee | G06K 9/00604 348/222.1 |
| 2013/0035979 A1* | 2/2013 | Tenbrock | G06Q 30/02 705/7.29 |
| 2013/0111509 A1* | 5/2013 | Guo | G06K 9/00677 725/12 |
| 2013/0304565 A1* | 11/2013 | Saccoman | G06Q 30/00 705/14.41 |
| 2014/0195345 A1* | 7/2014 | Lyren | G06Q 30/0271 705/14.53 |
| 2014/0201004 A1* | 7/2014 | Parundekar | G06Q 30/0265 705/14.62 |
| 2014/0233912 A1* | 8/2014 | Cansler | H04N 21/458 386/249 |
| 2014/0376785 A1* | 12/2014 | Bathiche | G06K 9/00335 382/118 |
| 2015/0032760 A1* | 1/2015 | Farahat | G06Q 30/02 707/748 |
| 2015/0067714 A1* | 3/2015 | Bhogal | H04N 21/812 725/25 |
| 2015/0113560 A1* | 4/2015 | McCoy | H04N 21/812 725/32 |
| 2015/0227965 A1* | 8/2015 | Drysch | G06K 9/00818 705/14.45 |
| 2015/0332328 A1* | 11/2015 | Kim | G06Q 30/0261 705/14.58 |

* cited by examiner

*FIG. 6*

| NO. OF USERS | AD PLAYING LENGTH | SKIP PAST TO VIDEO | NO. OF BANNERS | AD AREA (pixels) |
|---|---|---|---|---|
| 1 | 2 min. | 30 sec. | 5 | 560*480 |
| 2 TO 5 | 1 min. | 15 sec. | 3 | 480*320 |
| 5 TO 10 | 30 sec. | 10 sec. | 2 | 320*240 |
| 10 OR MORE | 15 sec. | 5 sec. | 1 | 240*180 |

ADVERTISEMENT MANAGEMENT

CROSS-REFERENCE TO RELATED APPLICATION

The present application is a U.S. National Stage filing under 35 U.S.C. §371 of International Application No. PCT/US14/11621, filed on Jan. 15, 2014.

BACKGROUND

Online advertising uses the Internet to deliver promotional marketing messages to consumers. Also known as Internet advertising, it includes email marketing, search engine marketing, social media marketing, various types of display advertising (including web banner advertising), and mobile device advertising. Like other advertising media, online advertising frequently involves both a publisher, who integrates advertisements into its online content, and an advertiser, who provides the advertisements to be displayed on the publisher's content. Other potential participants include advertising agencies who help generate and place the ad copy, an ad server who technologically delivers the ad and tracks statistics, and advertising affiliates who do independent promotional work for the advertiser. Online advertising is growing rapidly and is widely used across virtually all industry sectors.

SUMMARY

In an example, a method performed under control of an electronic device may include counting a number of users proximate to the electronic device; adjusting at least one attribute associated with an advertisement based at least in part on the counted number of users; and providing the users with the advertisement for which the at least one attribute has been adjusted.

In another example, an electronic device may include a camera configured to capture an image of at least one user proximate to the electronic device; a counter unit configured to count the number of the at least one user based at least in part on the captured image; a receiver unit configured to receive an advertisement from an advertisement server; an adjustment unit configured to adjust at least one attribute associated with the advertisement based at least in part on the counted number of the at least one user; and a display configured to display the advertisement for which the at least one attribute has been adjusted.

In yet another example, a computer-readable storage medium may store thereon computer-executable instructions that, in response to execution, cause a an electronic device to perform operations, including counting a number of users proximate to the electronic device; adjusting at least one attribute associated with an advertisement based at least in part on the counted number of users; and providing the users with the advertisement for which the at least one attribute has been adjusted.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 shows an example of a look-up table to implement at least one example embodiment of an advertisement management scheme, arranged in accordance with at least some embodiments described herein;

DETAILED DESCRIPTION

Figure 1:
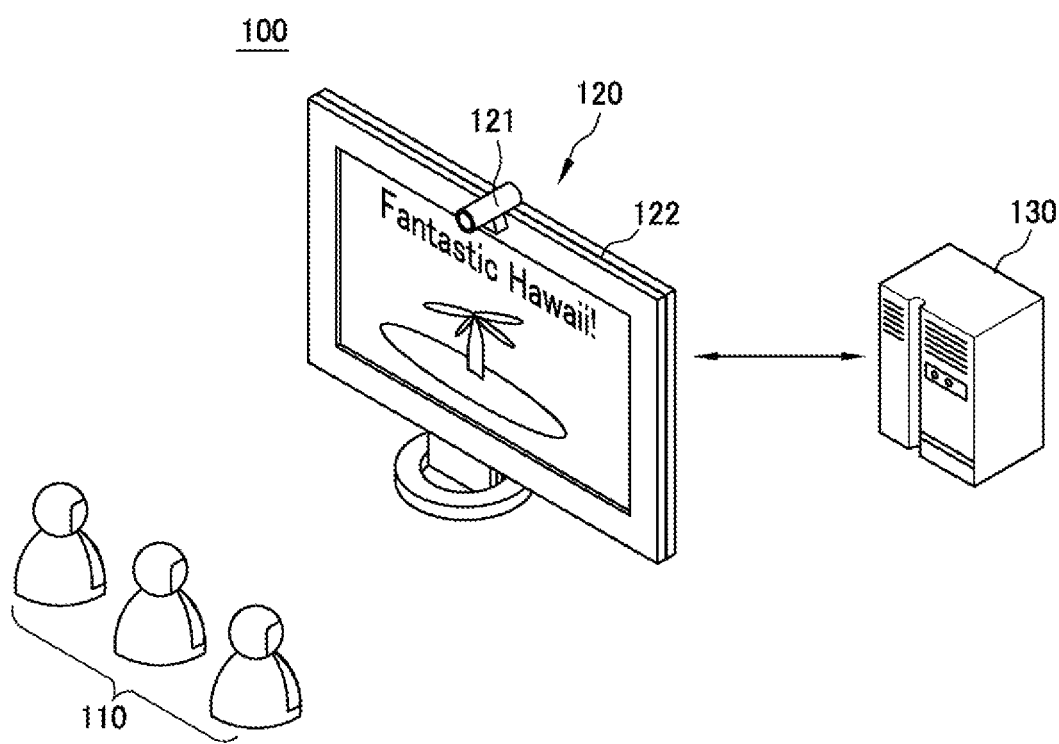
FIG. 1 shows an example of an environment in which multiple users may view an advertisement that is transmitted from an advertisement server and is displayed by an electronic device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to advertisement management. Further, technologies are herein generally described for adjusting at least one attribute associated with an advertisement based on a number of detected users watching the advertisement.

In some examples, an electronic device, which may be configured to receive an advertisement from an advertisement server and to provide the received advertisement to one or more users located proximate to the electronic device, may detect the one or more users and count a number of the detected users. In such cases, the electronic device may capture an image of the detected users using a camera operatively coupled to the electronic device and count a reference feature of each of the detected users in the captured image. By way of example, the reference feature may include, but not be limited thereto, a head, a pair of eyes, or some other facial feature of each of the detected users. Additionally and/or alternatively, the electronic device may receive, by a signal receiver operatively coupled to the electronic device, at least one signal from at least one client device associated with at least one of the detected users and count the received signal to obtain the number of the detected users.

In some examples, the electronic device may adjust at least one attribute associated with the received advertisement based at least in part on the counted number of detected users. By way of example, the at least one attribute may include, but not be limited thereto, a playing length of the advertisement, a minimum amount of time for which the advertisement is to be viewed before one of the detected users is permitted to skip past the advertisement, a number of banners to be displayed together with non-advertisement content, a display area in which the advertisement is displayed, etc. The electronic device may provide the detected users with the advertisement for which the at least one attribute has been adjusted.

FIG. 1 shows an example of an environment in which multiple users 110 may watch an advertisement that is transmitted from an advertisement server 130 and is displayed by an electronic device 120, arranged in accordance with at least some embodiments described herein.

As depicted, electronic device 120 may be communicatively coupled to advertisement server 130 over a network such as, for example, the Internet, a wireless network, a cellular network, a wide area network (WAN), a metropolitan area network (MAN), a local area network (LAN), a campus area network (CAN), a virtual private network (VPN), etc. Electronic device 120 may be any type of electronic device configured to receive, transmit, store, retrieve, compute and/or display data, which may include advertisement data such as, for example, text data, image data, video data, audio data, or audio-video data. By way of example, but not limitation, electronic device 120 may include a smartphone, a mobile phone, a personal digital assistant (PDA), a tablet, a hybrid of the aforementioned devices, a personal computer such as a laptop computer or a desktop computer, a television, a gaming console, an electronic billboard, etc. Further, as depicted in FIG. 1, electronic device 120 may include a camera 121 and a display 122.

Advertisement server 130 may be configured to store and host at least one advertisement to be provided to electronic devices including electronic device 120. In some embodiments, advertisement server 130 may be associated with a content server, which may also provide non-advertisement content (such as, for example, a web page, a movie, a news clip, etc.) to electronic device 120; and may be configured to provide at least one advertisement (such as, for example, a banner image, an advertisement video clip, etc.) in association with the non-advertisement content. In some other embodiments, advertisement server 130 may also be configured to host the non-advertisement content and provide electronic device 120 with the non-advertisement content together with at least one advertisement.

As described earlier, electronic device 120 may include a camera 121 and a display 122, respectively integrated or connected to electronic device 120. Display 122 may be configured to display, among other content, an advertisement transmitted from advertisement server 130. Camera 121, in accordance with some embodiments of advertisement management, may be configured to capture an image of users 110 who may be located proximate to electronic device 120 to view display 122. Although FIG. 1 shows three users 110, it is by way of an example and any number of users may watch display 122. The number of users 110 that may be captured by camera 121 may be limited by the focal range of the camera.

In some embodiments, electronic device 120 may be configured to detect users 110 in the captured image and count the number of detected users 110. By way of example, but not limitation, electronic device 120 may be configured to count the number of users 110 in the captured image by detecting a reference feature of each of users 110 (such as, for example, a head, a pair of eyes, and/or some other facial feature of each of users 110). Additionally and/or alternatively, electronic device 120 may optionally further include a signal receiver configured to receive signals from one or more mobile devices that at least some of users 110 have so that electronic device 120 may count the number of users 110 based, at least in part, on the received signals. By way of example, but not limitation, it is assumed that all of users 110 have a mobile device that transmits a periodic signal (such as, for example, a beacon signal, a probe request signal, etc.). Then, electronic device 120 may monitor and detect such signals to count the number of users 110.

In some embodiments, electronic device 120 may classify detected users 110 into several groups (such as, for example, men/women/children/senior citizen, etc.) and count the number of users in each group. In such cases, electronic device 120 may perform the classification such as, for example, by using a facial recognition technology in association with the captured image and/or by analyzing any information included in the signals received from the mobile devices of users 120 (such as, for example, available user information of corresponding mobile device).

In some embodiments, electronic device 120 may be configured to adjust at least one attribute associated with an advertisement transmitted from advertisement server 130 and to be displayed on display 122, based at least in part on the counted number of detected users 110. Further, electronic device 120 may be configured to provide users 110 with the advertisement for which the at least one attribute has been adjusted. That is, the advertisements to be viewed by users 110 may be tailored and/or customized in accordance with the one or more adjusted attributes. The advertisement may include a video file and/or one or more image files, and electronic device 120 may adjust at least one attribute of the video file and/or the one or more image files and provide the adjusted video and/or image files to users 110. As a non-limiting example, when the advertisement includes a video file, electronic device 120 may adjust a playing length of the video file, based on the counted number of detected users 110, and play, on display 122, the video file for the adjusted length. As another non-limiting example, when the advertisement includes one or more image files, electronic device 120 may select at least one image file from among the one or more image files, and display, on display 122, the selected at least one image file. Various examples regarding the adjusting and providing of the advertisement will be described in more details with reference to FIGS. 2 and 6 below.

Figure 2A:
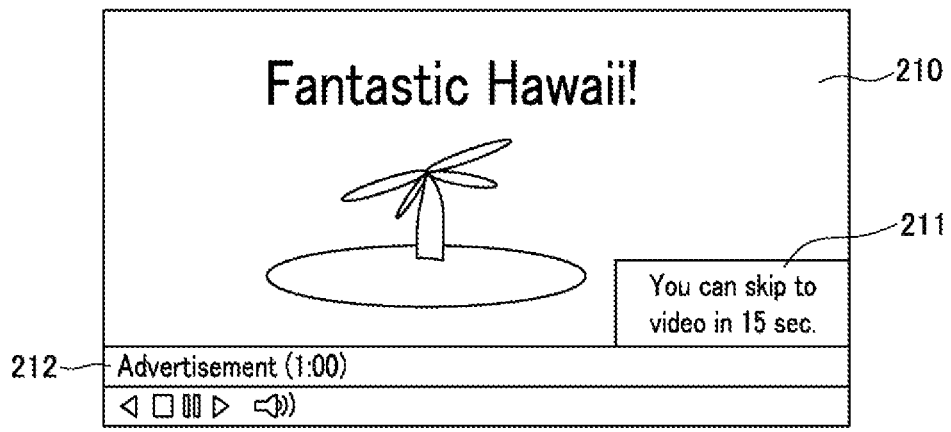
FIGS. 2A to 2C show examples of screenshots of a display of an electronic device that may display one or more advertisements, arranged in accordance with at least some embodiments described herein.
Figure 2B:
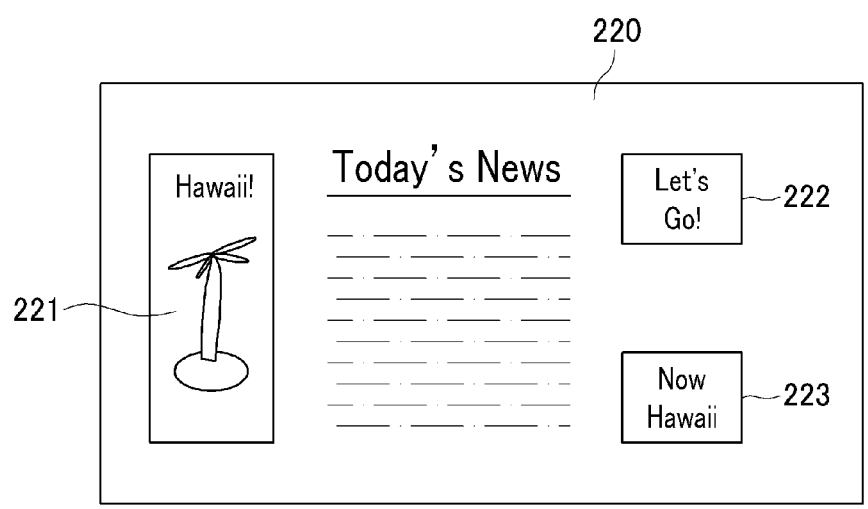
Figure 2C:
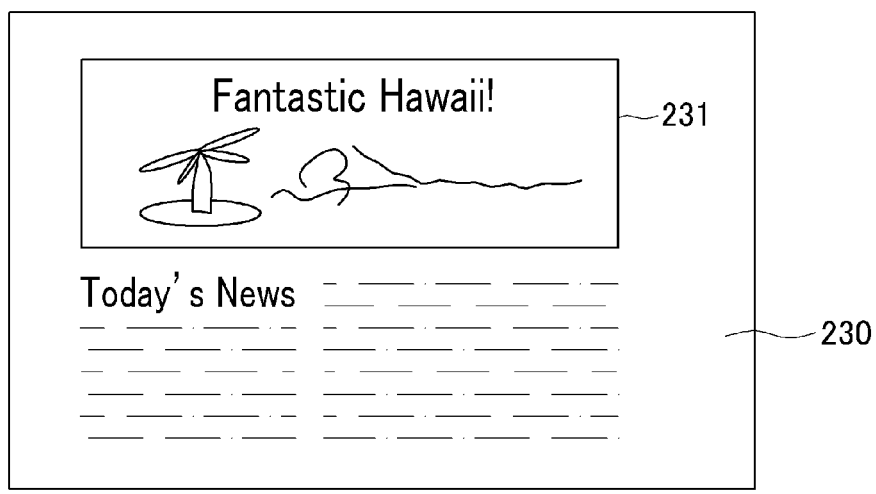

FIGS. 2A to 2C show examples of screenshots 210, 220 and 230 of display 122 of electronic device 120 that may display one or more advertisements, arranged in accordance with at least some embodiments described herein. Reference may be made to the embodiments depicted and described with reference to FIG. 1.

Screenshot 210 of FIG. 2A shows a screenshot of an advertisement that includes a video file. By way of example, but not limitation, electronic device 120 may be playing the video file (of "Fantastic Hawaii!"), using a video player application, which may be followed by non-advertising content (e.g., a movie). A portion 211 of screenshot 210 indicates a minimum amount of time (i.e., 15 seconds) for which the video file is to be viewed before one of users 110 is permitted to skip past the video advertisement. Another portion 212 of screenshot 210 indicates a playing length of the video file.

In some embodiments, electronic device 120 may adjust at least one attribute of the video file (such as, for example, the minimum amount of time to skip past the video file or the playing length of the video file) based on the counted number of detected users. As non-limiting examples, electronic device 120 may reduce the minimum amount of time to skip past the video file from 15 seconds (as indicated in portion 211) to 10 seconds when the counted number of detected users is 2 or more (and less than 5); and to 5 seconds when the counted number of detected users is 5 or more. As another non-limiting example, electronic device 120 may shorten the playing length of the video file from 1 minute (as indicated in portion 211) to 30 seconds when the counted number of detected users is 2 or more (and less than 5); and to 15 seconds when the counted number of detected users is 5 or more.

Screenshot 220 of FIG. 2B shows a screenshot of a web page that includes multiple advertisement banners 221, 222 and 223. By way of example, but not limitation, electronic device 120 may display the web page (of "Today's News") using a web browser application. In some embodiments, electronic device 120 may select at least one banner from among banners 221, 222 and 223 based on the counted number of detected users. By way of example, but not limitation, electronic device 120 may select two banners (e.g., banners 221 and 222) when the counted number of detected users is 2 or more (and less than 5); and one banner (e.g., banner 221) when the counted number of detected users is 5 or more.

Screenshot 230 of FIG. 2C shows a screenshot of a web page that includes an advertisement 231. By way of example, but not limitation, electronic device 120 may display the web page (of "Today's News") using a web browser application. In some embodiments, electronic device 120 may determine a display area in which advertisement 231 is displayed. By way of example, but not limitation, electronic device 120 may set the display area as 480*360 pixels when the counted number of detected users is 2 or more (and less than 5); and as 360*280 pixels when the counted number of detected users is 5 or more.

The examples described with reference FIGS. 2A to 2C are illustrative only, and those skilled in the art would appreciate various examples of adjusting advertisements based on the types of advertisements and the number of detected users.

Figure 3:
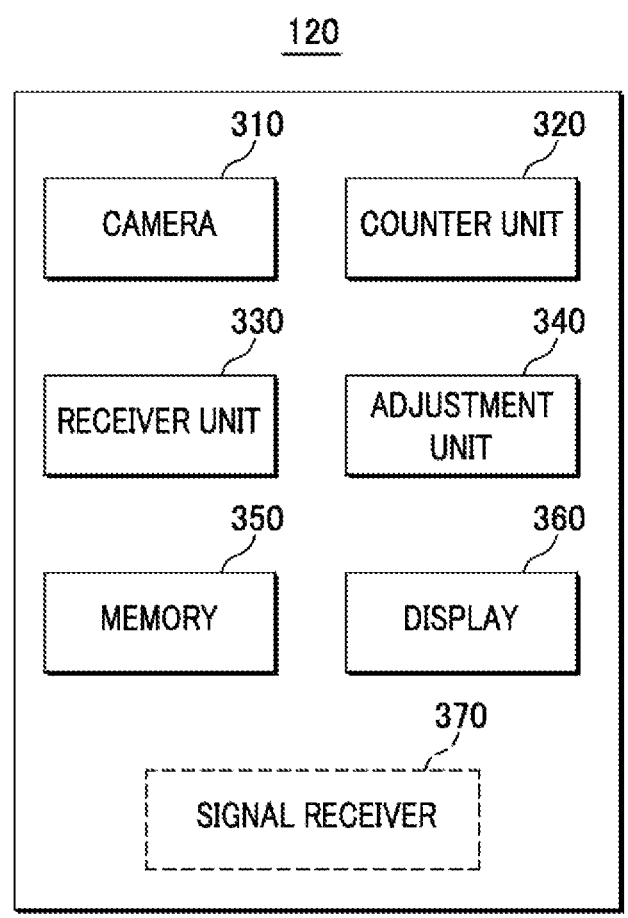
FIG. 3 shows a block diagram of an example architecture of an electronic device configured to implement an advertisement management scheme, arranged in accordance with at least some embodiments described herein.

FIG. 3 shows a block diagram of an example architecture of an electronic device 120 configured to implement an advertisement management scheme, arranged in accordance with at least some embodiments described herein. Reference may be made to the embodiments depicted and described with reference to FIGS. 1 and 2.

As depicted, electronic device 120 may include a camera 310, a counter unit 320, a receiver unit 330, an adjustment unit 340, a memory 350 and a display 360. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Camera 310 may be configured to capture an image of at least some of users 110 located proximate to electronic device 120. Although camera 310 is depicted as a part of electronic device 120 in FIG. 3, in some other embodiments, camera 310 may be operatively coupled to electronic device 120 as a separate device. The captured image may be provided to counter unit 320.

Counter unit 320 may be configured to detect the users in the captured image and count a number of the detected users. By way of example, but not limitation, counter unit 120 may be configured to count the number of users by detecting a reference feature of each user (such as, for example, a head, a pair of eyes, and/or some other facial feature of each user). In some embodiments, electronic device 120 may optionally further include a signal receiver 370. In such embodiments, signal receiver 370 may be configured to receive signals from one or more mobile devices that the users have, and counter unit 120 may be configured to determine the number of users by counting the received signals.

Receiver unit 330 may be configured to receive an advertisement from advertisement server 130. In some embodiments, receiver unit 330 may further receive non-advertisement content from advertisement server 130. In some other embodiments, receiver unit 330 may receive non-advertisement content from a separate server that provides the non-advertisement content. The advertisement may be in various forms, such as, for example, a video file, an audio file, an audio-video file, a still image, a flash image, etc. Further, the advertisement may have at least one attribute which is adjustable. By way of example, but not limitation, the at least one attribute may include a playing length of the advertisement, a minimum amount of time to skip past the advertisement, etc.

Adjustment unit 340 may be configured to adjust at least one attribute associated with the advertisement based at least in part on the counted number of detected users. In some embodiments, adjustment unit 340 may adjust the at least one attribute to maintain the advertisement effectiveness at a predetermined level based on the counted number of detected users. That is, adjustment unit 340 may decrease a total number of airings of the advertisement to the detected users when the counted number of detected users is a number that is sufficiently high for the advertiser's consideration; and increase the total amount of the advertisement when the counted number of detected users is a number that is considered to be insufficiently low by the advertiser.

As a non-limiting example, provided that the advertisement includes a video file and a default amount of time for which the video file is to be viewed before a user is permitted to skip past the video file is 15 seconds when the number of viewer is one, adjustment unit 340 may reduce the minimum amount of time to skip past the video file from 15 seconds to 10 seconds when the counted number of detected users is 2 or more (and less than 5); and to 5 seconds when the counted number of detected users is 5 or more. As another non-limiting example, provided that the advertisement includes a video file and a default playing length of the video file is 1 minutes when the number of viewer is one, adjustment unit 340 may shorten the playing length of the video file from 1 minute to 30 seconds when the counted number of detected users is 2 or more (and less than 5); and to 15 seconds when the counted number of detected users is 5 or more. As such, adjustment unit 340 may control the total amount of the advertisement based on the counted number of detected users so that the advertisement effectiveness can be maintained at a predetermined level.

In some embodiments, adjustment unit 340 may be configured to modify the advertisement that includes a video file, based on the counted number of detected users. In such embodiments, adjustment unit 340 may edit the video file such that the video file plays for a predetermined time, which depends on the counted number of detected users. By way of example, if the counted number of detected users is higher than a default number of detected users, adjustment unit 340 may shorten the playing time of the video file by cutting out at least a portion of the video file. In some other embodiments, adjustment unit 340 may be configured to select a modified video file from among multiple modified video files stored in advertisement database associated with advertisement server 130, based on the counted number of detected users. In such embodiments, the advertisement database may store, in advance, the multiple modified video files for the advertisement, each of which has a different playing length. Then, adjustment unit 340 may select one of the multiple modified video files based on the counted number of detected users. By way of example, if the counted number of detected users is higher than a default number of detected users, adjustment unit 340 may select a modified video file having a shorter playing length from among the multiple modified video files.

In some embodiments, when the advertisement received from advertisement server 130 includes one or more image files, adjustment unit 340 may be configured to select at least one image file from among the one or more image files, based on the counted number of detected users. By way of examples, if the counted number of detected users is higher than a default number of detected users and a default number of image files to be provided to the default number of detected users is three, adjustment unit 340 may select less than two image files. Additionally and/or alternatively, adjustment unit 340 may be configured to determine a display area in which the advertisement is displayed, based on the counted number of detected users. In such cases, adjustment unit 340 may set a smaller size of display area for the advertisement, when the counted number of detected users is higher than a default number of detected users. Various examples of adjusting various attributes of advertisements based on a counted number of detected users will be described in more details with reference FIG. 6 below.

Memory 350 may be configured to store the advertisement received from advertisement server 130 and/or non-advertisement content receiver from advertisement server 130 or a separate server. Display 360 may be configured to display the advertisement for which the at least one attribute has been adjusted.

Figure 4:
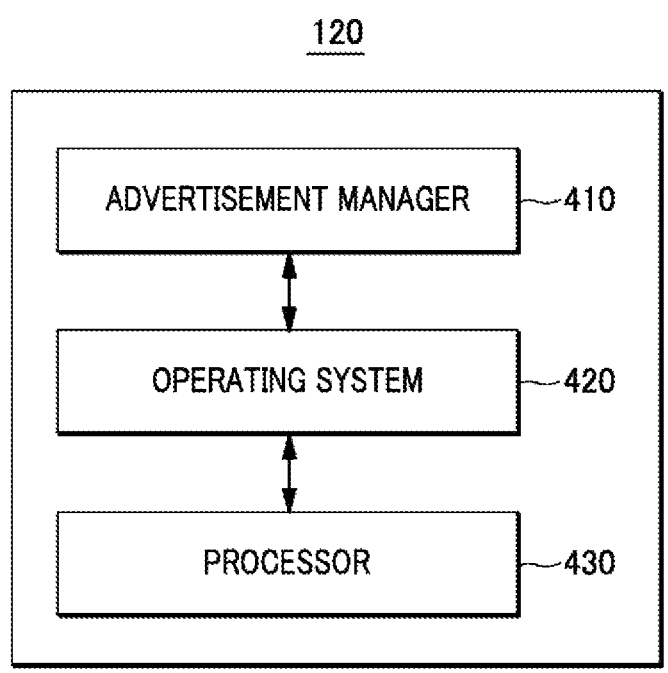
FIG. 4 shows a block diagram of another example architecture of an electronic device to implement an advertisement management scheme, arranged in accordance with at least some embodiments described herein.

FIG. 4 shows a block diagram of another example architecture of electronic device 120 to implement an advertisement management scheme, arranged in accordance with at least some embodiments described herein. Reference may be made to the embodiments depicted and described with reference to FIGS. 1 to 3.

Ad depicted, electronic device 120 may include an advertisement manager 410, an operating system 420 and a processor 430. Advertisement manager 410 may be adapted to operate on operating system 420 such that the advertisement management scheme, as described herein, may be provided. Operating system 420 may allow advertisement manager 410 to manipulate processor 430 to implement the advertisement management scheme as described herein.

Figure 5:
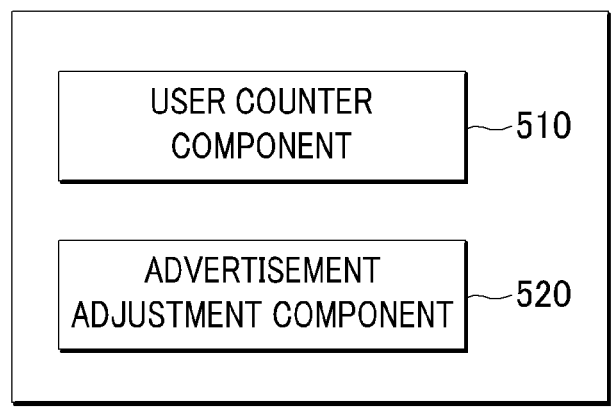
FIG. 5 shows a block diagram of an example architecture of an advertisement manager to implement an advertisement management scheme, arranged in accordance with at least some embodiments described herein.

FIG. 5 shows a block diagram of an example architecture of advertisement manager 410 to implement an advertisement management scheme, arranged in accordance with at least some embodiments described herein. Reference may be made to the embodiments depicted and described with reference to FIGS. 1 to 4.

Ad depicted, advertisement manager 410 may include a viewer counter component 510 and an advertisement adjustment component 520. Viewer counter component 510 may be adapted to count a number of detected users located proximate to electronic device 120 in accordance with various example methods as described above. Further, advertisement adjustment component 520 may be adapted to adjust at least one attribute associated with an advertisement based on the counted number of detected users, and various example methods described above may be utilized in the adjustment.

FIG. 6 shows an example of a look-up table 600 to implement at least one example embodiment of an advertisement management scheme, arranged in accordance with at least some embodiments described herein. Reference may be made to the embodiments depicted and described with reference to FIGS. 1-5.

As depicted, a first column 610 may indicate a counted number of detected users (i.e., the number of viewers watching an advertisement displayed by electronic device 120); and second to fifth columns 620 to 650 may indicate attributes associated with advertisements to be adjusted based on the counted number of detected users. Further, rows 660-690 may respectively list a different option for adjusting each attribute in accordance with the counted number of detected users. As can be understood from look-up table 600, as the counted number of detected users increases, a total amount of each advertisement (e.g., a total amount of occurrences of each advertisement, a total amount of time for which each advertisement is shown, etc.) decreases. For example, the number of advertisement banners to be displayed becomes less and less as the counted number of detected users increases. As such, the total amount of advertisement may be controlled based on the counted number of detected users so that the advertisement effectiveness can be maintained at a predetermined level.

In some embodiments, look-up table 600 may be stored in, for example, memory 350 of electronic device 120 and may be referenced by adjustment unit 340 of electronic device 340 to adjust an attribute of an advertisement. In accordance with one non-limiting example, when it is predetermined to adjust, based on the counted number of detected users, a playing length of the advertisement (depending on a type of the advertisement, etc.), electronic device 120 (e.g., adjustment unit 340 in FIG. 3) may adjust the playing length of the advertisement with reference to second column 620 of look-up table 600. For instance, if the counted number of detected users (obtained by, for example, counter unit 320 in FIG. 3) is three, electronic device (e.g., adjustment unit 340 in FIG. 3) may adjust the playing length of the advertisement to 1 minute.

As such, electronic device 120 may be able to adjust attributes of advertisements with reference to look-up table. One skilled in the art would appreciate that the attributes, the counted number of detected users and the values for adjustment illustrated in look-up table 600 are non-limiting example parameters and any other parameters for implementing the modification scheme in accordance with multiple embodiments described herein will be available for look-up table 600.

Figure 7:
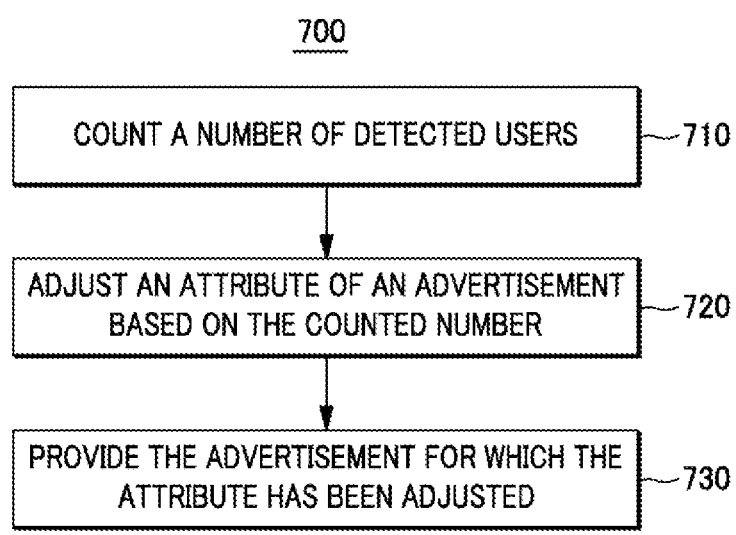
FIG. 7 shows an example flow diagram of a process to implement an advertisement management scheme, arranged in accordance with at least some embodiments described herein.

FIG. 7 shows an example flow diagram of a process to implement an advertisement management scheme, arranged in accordance with at least some embodiments described herein.

Process 700 may be implemented in an electronic device such as electronic device 120 including at least some of camera 310, counter unit 320, receiver unit 330, adjustment unit 340, memory 350, display 360 or signal receiver 370. Process 700 may also be implemented by computer programs or program modules that may be adapted to provide an advertisement management scheme and hosted by electronic device 120, such as advertisement manager 410 including user counter component 510 and advertisement adjustment component. Thus, reference may be made to the embodiments depicted and described with reference to FIGS. 1-6. Process 700 may include one or more operations, actions, or functions as illustrated by one or more blocks 710, 720 and/or 730. Although illustrated as discrete blocks, various blocks may be divided into additional blocks, combined into fewer blocks, or eliminated, depending on the desired implementation. Processing may begin at block 710.

At block 710 (Count a Number of Detected Users), electronic device 120 and/or advertisement manager 410 may count a number of users located proximate to electronic device 120 and detected by, for example, camera 310 and/or signal receiver 370. Processing may continue from block 710 to block 720.

At block 720 (Adjust an Attribute of an Advertisement Based on the Counted Number), electronic device 120 and/or advertisement manager 410 may adjust at least one attribute associated with an advertisement based at least in part on the counted number of detected users. In some embodiments, electronic device 120 and/or advertisement manager 410 may adjust the at least one attribute in a way that a total amount of the advertisement is reduced as the counted number of detected users increases. Processing may continue from block 720 to block 730.

At block 730 (Provide the Advertisement for Which the Attribute Has Been Adjusted), electronic device 120 and/or advertisement manager 410 may provide the detected users with the advertisement for which the at least one attribute has been adjusted. In some embodiments, electronic device 120 may display the advertisement on display 360 for the detected users to watch the advertisement.

As such, the total amount of advertisement may be tailored and/or customized depending on the number of users watching the advertisement, and thus, the advertisement effectiveness may be maintained at a predetermined level. Further, the more users watch the advertisement, the less advertisement is provided to the users, and the users are less disturbed by the advertisement.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
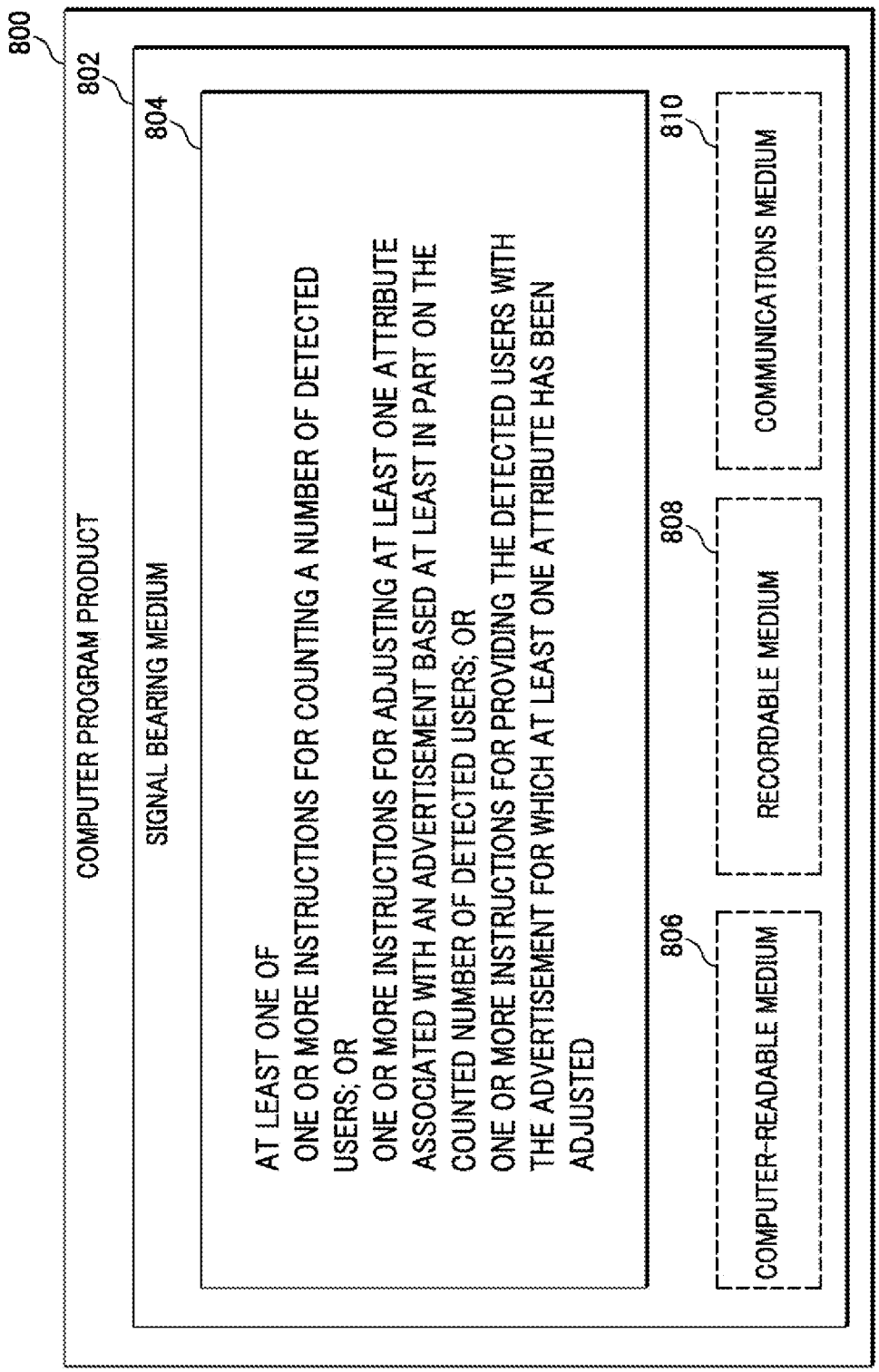
FIG. 8 illustrates an example computer program product that may be utilized to implement an advertisement management scheme, arranged in accordance with at least some embodiments described herein.

FIG. 8 illustrates an example computer program product 800 that may be utilized to implement an advertisement management scheme, arranged in accordance with at least some embodiments described herein.

As depicted, computer program product 800 may include a signal bearing medium 802. Signal bearing medium 802 may include one or more instructions 804 that, when executed by, for example, a processor of electronic device 120 may provide the functionality described above with respect to FIGS. 1-7. By way of example, instructions 804 may include: one or more instructions for counting a number of detected users; or one or more instructions for adjusting at least one attribute associated with an advertisement based at least in part on the counted number of detected users; or one or more instructions for providing the detected users with the advertisement for which the at least one attribute has been adjusted.

In some implementations, signal bearing medium 802 may encompass a computer-readable medium 806, such as, but not limited to, a hard disk drive (HDD), a comact disc (CD), a digital versatile disc (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communication link, a wireless communication link, etc.). Thus, for example, computer program product 800 may be conveyed to one or more modules of electronic device 120 by an RF signal bearing medium 802, where the signal bearing medium 802 is conveyed by a wireless communications medium 810 (e.g., a wireless communications medium conforming with the IEEE 802.11 standard).

Figure 9:
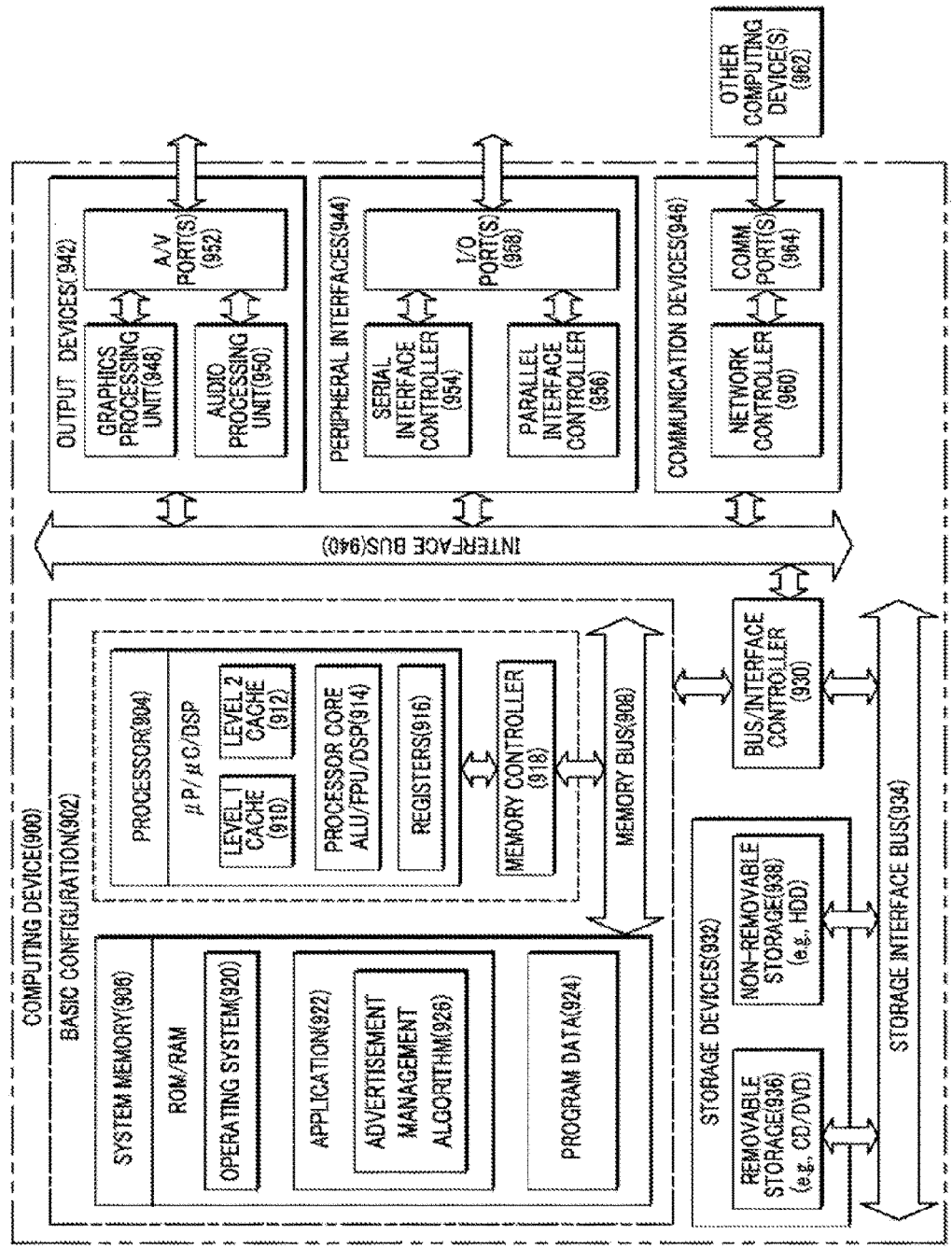
FIG. 9 is a block diagram illustrating an example computing device that may be utilized to implement an advertisement management scheme, arranged in accordance with at least some embodiments described herein.

FIG. 9 is a block diagram illustrating an example computing device 900 that may be utilized to implement an advertisement management scheme, arranged in accordance with at least some embodiments described herein.

In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), nonvolatile memory (such as ROM, flash memory, etc.) or any combination thereof. System memory 906 may include an operating system 920, one or more applications 922, and program data 924.

Application 922 may include an advertisement management algorithm 926 that may be arranged to perform the functions as described herein including the actions described with respect to electronic device 120 architecture as shown in FIGS. 3-5 or including the actions described with respect to the flow chart shown in FIG. 7. Program data 924 may include any data that may be useful for providing the advertisement management scheme as is described herein. In some examples, application 922 may be arranged to operate with program data 924 on an operating system 920 such that the advertisement management scheme as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an electronic device, the method comprising:
    counting, by the electronic device, a number of users proximate to the electronic device;
    adjusting, by the electronic device, at least two attributes of a plurality of attributes associated with an advertisement,
        wherein the adjusting is based at least in part on the counted number of users,
        wherein the advertisement includes a video file,
        wherein the plurality of attributes includes an advertisement play length of the video file, a skip past time to the video file, a number of banners, and an advertisement area, and
        wherein the adjusting includes selecting, based at least in part on the counted number of users, a modified video file from among a plurality of modified video files stored in an advertisement database; and
    providing, by the electronic device, the users with the selected modified video file,
        wherein the providing includes playing, on a display, the selected modified video file.

2. The method of claim 1, wherein the counting includes:
    capturing, by a camera, an image of the users; and
    counting a reference feature of each of the users in the captured image.

3. The method of claim 1, wherein the counting includes:
    receiving, by a signal receiver, at least one signal from at least one client device associated with at least one of the users.

4. The method of claim 1,
    wherein in response to adjustment of the advertisement play length of the video file, the providing includes playing, on the display, the selected modified video file for the adjusted play length.

5. The method of claim 1, wherein the adjusting includes modifying the video file based at least in part on the counted number of users.

6. The method of claim 1, wherein:
    the adjusting the at least two attributes includes adjusting the skip past time to the video file by adjusting a minimum amount of time for which the video file is to be viewed before one of the users is permitted to skip past the video file, and
    the providing includes playing, on the display, the selected modified video file for at least the minimum amount of time for which the video file is to be viewed.

7. The method of claim 1, wherein:
    the adjusting the at least two attributes includes adjusting the advertisement area by determining a display area in which the video file is to be displayed, and
    the providing includes displaying, on the display, the selected modified video file in the determined display area.

8. An electronic device, comprising:
    a camera configured to capture an image of at least one user proximate to the electronic device;
    a counter unit operatively coupled to the camera and configured to count a number of the at least one user based at least in part on the captured image;
    a receiver unit operatively coupled to the counter unit and configured to receive an advertisement from an advertisement server, wherein the advertisement includes a video file;
    an adjustment unit operatively coupled to the counter unit and receiver unit and configured to adjust at least two attributes of a plurality of attributes associated with the video file,
        wherein the adjustment is based at least in part on the counted number of the at least one user,
        wherein the plurality of attributes includes an advertisement play length of the video file, a skip past time to the video file, a number of banners, and an advertisement area, and
        wherein the adjustment unit is further configured to select, based at least in part on the counted number of the at least one user, a modified video file from among a plurality of modified video files stored in an advertisement database that is operatively coupled to the advertisement server; and a display operatively coupled to the adjustment unit and configured to display and play the selected modified video file.

9. The electronic device of claim 8, wherein in response to adjustment of the advertisement play length of the video file, the display is further configured to play the selected modified video file for the adjusted play length.

10. The electronic device of claim 8, wherein the adjustment unit is configured to modify the video file based at least in part on the counted number of the at least one user.

11. The electronic device of claim 8, wherein:

the adjustment unit is configured to adjust the skip past time to the video file by adjustment of a minimum amount of time for which the video file is to be viewed before one of the at least one user is permitted to skip past the video file, and the display is configured to play the selected modified video file for at least the minimum amount of time for which the video file is to be viewed.

12. The electronic device of claim 8, wherein:

the adjustment unit is configured to adjust the advertisement area by a determination of a display area in which the video file is to be displayed, and the display is configured to display the selected modified video file in the determined display area.

* * * * *

UNITED STATES PATENT AND TRADEMARK OFFICE
CERTIFICATE OF CORRECTION

PATENT NO. : 9,830,618 B2
APPLICATION NO. : 14/377393
DATED : November 28, 2017
INVENTOR(S) : Kim Page 1 of 1

It is certified that error appears in the above-identified patent and that said Letters Patent is hereby corrected as shown below:

In the Specification

In Column 10, Line 25, delete "comact" and insert -- compact --, therefor.

In Column 10, Lines 59-60, delete "implementations memory" and insert -- implementations, memory --, therefor.

In Column 13, Line 7, delete "general such" and insert -- general, such --, therefor.

Signed and Sealed this
Seventeenth Day of April, 2018

Andrei Iancu
*Director of the United States Patent and Trademark Office*